(No Model.)

J. R. HUNTER.
FRUIT PICKER.

No. 357,770. Patented Feb. 15, 1887.

WITNESSES:
C. Neveux
C. Sedgwick

INVENTOR:
J. R. Hunter
BY Munn & Co.
ATTORNEYS.

UNITED STATES PATENT OFFICE.

JESSE RUTLEDGE HUNTER, OF PALATKA, FLORIDA.

FRUIT-PICKER.

SPECIFICATION forming part of Letters Patent No. 357,770, dated February 15, 1887.

Application filed April 19, 1886. Serial No. 199,341. (No model.)

*To all whom it may concern:*

Be it known that I, JESSE RUTLEDGE HUNTER, of Palatka, in the county of Putnam and State of Florida, have invented a new and useful Improvement in Fruit Pickers, of which the following is a specification, reference being had to the annexed drawings, forming a part thereof, in which—

Figure 1:
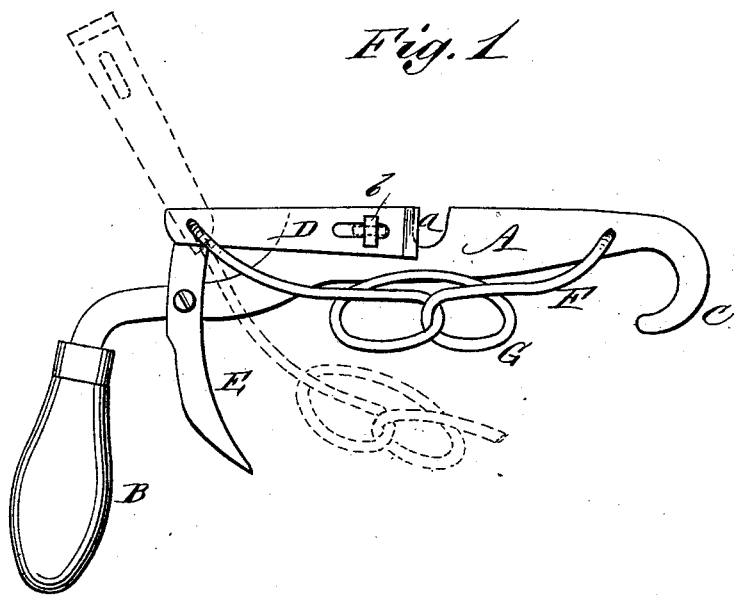
Figure 2:
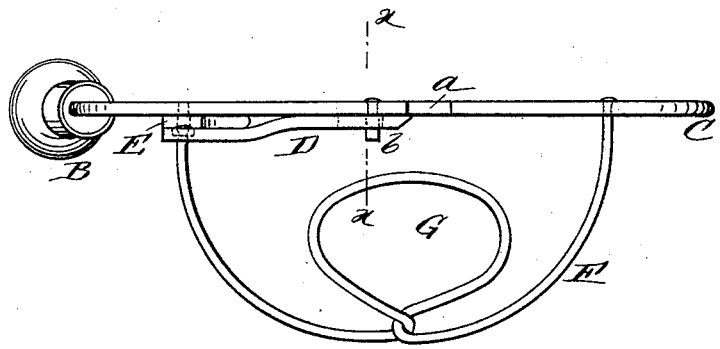
Figure 3:

Figure 1 is a side elevation of my improved fruit-picker. Fig. 2 is a plan view. Fig. 3 is a transverse section taken on line $x\ x$ in Fig. 2.

Similar letters of reference indicate corresponding parts in the different figures of the drawings.

The object of my invention is to provide a simple and convenient implement for picking fruit from trees and retaining it after it is picked.

My invention consists in the construction and arrangement of parts, as will be hereinafter fully described and claimed.

The arm A, forming the body of the implement, is curved downward rearwardly to receive the handle B, by which the implement is held. At the end of the arm A, opposite the handle, is formed a hook, C, for engaging the branches of the tree to bring them within easy reach of the operator. At or near the middle of the arm A is formed a notch, $a$, the forward wall of which forms a shoulder, against which the stem of the fruit is forced by the forward movement of the cutter, to be presently described, and upon the T-headed rivet $b$, swiveled near the notch, is received a slotted cutting-blade, D, which projects beyond the straight portion of the arm toward the handle, and is jointed to a lever, E, which is pivoted to the arm A, and extends downward nearly parallel with the handle B.

A wire spring, F, connected at one end with the arm A, near the hook C, and at the opposite end with the cutting-blade D, at or near its pivotal connection with the lever E, is bowed outward away from the arm A, and is provided with an inwardly-turned loop, G, opposite the notch $a$, which is bent downward laterally to form a support for the fruit separated from its stem by the cutting-blade D.

The picker is used by placing the stem of the fruit within the notch $a$, the shoulder formed thereby serving to prevent the forward movement thereof, then pulling on the lever E, so as to force the cutting-blade D forward against the stem, now resting against the said stem-supporting shoulder, and sever it. The fruit will be received in the wire-loop spring F. The wire-looped spring F, besides serving to receive the fruit in the manner described, acts as a spring for returning the cutting-blade D and lever E to their original position.

When it is desired to sharpen the cutting-blade D, it may be removed from the arm A by turning the T-headed rivet parallel with the slot in the cutting-blade, springing the cutting-blade outward, and turning it back to the position shown in dotted lines in Fig. 1, when it may readily be sharpened. On finishing, the cutting-blade may be returned to its place in a converse way.

I am aware that pruning implements and fruit-pickers have been provided with sliding and with pivoted cutters, and I do not claim the same as of my invention; nor do I limit myself to the use of either form of implement in connection with my improved fruit-holder.

Having thus described my invention, what I claim as new, and desire to secure by Letters Patent, is—

1. The combination, in a fruit-picker, of the arm forming the body of the implement, provided with a stem-supporting shoulder, with an operating-lever therefor, and a loop extending inward adjacent to the cutting devices and forming a fruit-holder, substantially as set forth.

2. The combination, with the arm forming the body of the implement provided with a stem-supporting shoulder, of an operating-lever therefor, and a spring-wire secured at one end to the said arm, connected at its opposite end to the said cutting-blade, and formed between its ends with a loop extending inward adjacent to the cutting devices, substantially as set forth.

3. The combination, with the main arm having a stem-supporting shoulder, of an operating-lever pivoted between its ends to the said arm, and a spring-wire connected at its forward end to the arm in advance of the cutting devices, pivotally connecting the lever and cutting-blade at its rear end, and formed with an intermediate loop extending inward adjacent to the cutting devices, substantially as set forth.

4. The combination, with the arm A, provided with the hook C, notch *a*, forming a stem-supporting shoulder, and handle B, of the sliding cutting-blade D, lever E, pivotally connected with the cutting-blade and fulcrumed on the arm A, and the looped-wire spring F G, serving the double purpose of a spring and fruit-receiver, substantially as herein shown and described.

JESSE RUTLEDGE HUNTER.

Witnesses:
W. B. CROSS,
M. H. DALTON.